United States Patent
Hökfelt

(10) Patent No.: US 9,376,831 B2
(45) Date of Patent: Jun. 28, 2016

(54) FOUNDATION SYSTEM FOR CHARGING POLES

(75) Inventor: Mathias Hökfelt, Täby (SE)

(73) Assignee: UNIMI SOLUTIONS AB (SE)

( * ) Notice: Subject to any disclaimer, the term of this patent is extended or adjusted under 35 U.S.C. 154(b) by 283 days.

(21) Appl. No.: 13/982,028

(22) PCT Filed: Jan. 27, 2012

(86) PCT No.: PCT/EP2012/051370
§ 371 (c)(1),
(2), (4) Date: Jul. 26, 2013

(87) PCT Pub. No.: WO2012/101266
PCT Pub. Date: Aug. 2, 2012

(65) Prior Publication Data
US 2013/0309022 A1    Nov. 21, 2013

(30) Foreign Application Priority Data
Jan. 28, 2011 (SE) .................................. 1150061

(51) Int. Cl.
*E04H 12/22* (2006.01)
*B60L 11/18* (2006.01)
*H02J 7/00* (2006.01)

(52) U.S. Cl.
CPC ............ *E04H 12/22* (2013.01); *B60L 11/1825* (2013.01); *E04H 12/2261* (2013.01); *H02J 7/0027* (2013.01); *Y02T 10/7005* (2013.01); *Y02T 10/7055* (2013.01); *Y02T 10/7072* (2013.01); *Y02T 90/121* (2013.01); *Y02T 90/128* (2013.01); *Y02T 90/14* (2013.01)

(58) Field of Classification Search
CPC ......... E02D 27/12; E02D 27/14; E02D 27/16; E02D 7/22; E02D 5/523
USPC ............... 404/11, 25, 26; 52/19, 20, 296; 320/109; 405/229, 230–233, 244, 405/250–252, 252.1, 266, 267
See application file for complete search history.

(56) References Cited

U.S. PATENT DOCUMENTS

| | | | | |
|---|---|---|---|---|
| 1,001,041 A | * | 8/1911 | Jones | A01K 3/002 404/25 |
| 2,236,775 A | * | 4/1941 | Hunsaker et al. | 52/294 |
| 3,988,870 A | * | 11/1976 | Snavely | E04H 12/2261 174/38 |
| 4,617,768 A | * | 10/1986 | Gebelius | E01F 9/016 248/159 |
| 4,716,508 A | | 12/1987 | Kramer et al. | |
| 4,860,507 A | * | 8/1989 | Garza-Tamez | E02D 27/34 248/560 |

(Continued)

FOREIGN PATENT DOCUMENTS

DE   20 2009 010127 U1   12/2009
DE   10 2009 016505 A1   10/2010

(Continued)

*Primary Examiner* — Sunil Singh
(74) *Attorney, Agent, or Firm* — Martin & Ferraro, LLP

(57) ABSTRACT

A device for mounting of a charging pole (1) has a foundation member (9) configured to be installed below ground level (6), and anchoring means (10) by which the charging pole (1) is mountable to the foundation member (9). The anchoring means (10) has a detachable adapter element (11) configured to fit a charging pole (1) to the foundation member (9). Such a mounting device (7) promotes deployment of infrastructure for charging of electric vehicles by providing a low-cost, future-proof platform for fitting charging poles (1) from any supplier using virtually any charging technology.

4 Claims, 6 Drawing Sheets

(56) References Cited

U.S. PATENT DOCUMENTS

| | | | | |
|---|---|---|---|---|
| 5,006,009 A | * | 4/1991 | Griffin | E01F 9/0186 40/608 |
| 5,263,298 A | * | 11/1993 | Ballesteros | E02D 29/12 174/37 |
| 5,582,720 A | * | 12/1996 | Deming | E02D 29/14 210/164 |
| 6,688,806 B2 | * | 2/2004 | Kuan | 404/25 |
| 6,898,882 B2 | * | 5/2005 | Kim | 40/607.1 |
| 8,111,043 B2 | * | 2/2012 | Redmann | 320/109 |
| 2011/0222963 A1 | * | 9/2011 | Kelley | E02D 29/14 404/25 |

FOREIGN PATENT DOCUMENTS

| | | |
|---|---|---|
| EP | 2 110 478 A2 | 10/2009 |
| GB | 2 254 349 A | 3/1991 |
| WO | WO 2007/135119 A1 | 5/2007 |
| WO | WO 2007/141543 A2 | 12/2007 |
| WO | WO 2011117430 A1 * | 9/2011 |

* cited by examiner

FOUNDATION SYSTEM FOR CHARGING POLES

This is a National Phase Application under 35 USC 371 of PCT/EP2012/051370 filed Jan. 27, 2012, and claims priority under 35 USC 365 (a)-(c) to Swedish Application No. 1150061-8 filed Jan. 28, 2011, all of which are incorporated herein by reference.

TECHNICAL FIELD

The present invention generally relates to infrastructure for electric or plug-in hybrid vehicles, and more specifically devices for anchoring a charging pole to ground.

BACKGROUND

Vehicles provided with electric motors and with batteries for powering the electric motors are becoming more and more popular. One reason is the ability to drive the vehicles without using combustion engines, thereby avoiding consumption of fossil fuels and emission of combustion gases.

Modern battery technology makes it possible to store enough energy on board a vehicle to drive it using only battery power, at least shorter distances. However, battery capacity is limited and cost is high and therefore infrastructure for charging the batteries should be readily available such that the vehicle can be charged at the convenience of the driver, for example outside a shopping mall, at a public car park or at work.

A major drawback for the prospective buyer of an electric vehicle is that there is no readily available infrastructure for charging electric vehicles. Hence, owning and operating an electric vehicle would potentially become very inconvenient.

Likewise, a major drawback exists for anyone thinking about deploying infrastructure for charging of electric vehicles since there is currently a very limited demand for such service, since barely any electric vehicles are in traffic today. A further drawback is that the installations are costly and typically require ground work, and that the demand for such service is very hard to predict. Also, there is a number of different technologies and voltages for charging electric vehicles and yet no well established standard.

Hence, pioneering companies and municipalities are left no other choice but to choose from these competing technologies and providers in order to offer electric charging to employees and inhabitants, any such choice being subject to the risk of the investing in a technology not demanded by tomorrow's drivers and to the risk of investing in too large or too small charging capacity.

Therefore, an improved infrastructure for electric vehicles would be advantageous in order to promote the occurrence of electric vehicles.

As background WO-A-2007/141543 could be mentioned. However, this known system does not offer a solution to the problems discussed above since the whole system is bound to a specific pole and a specific foundation. Furthermore the foundation member of WO-A-2007/141543 cannot be installed to prepare the street for later fitting of charging poles without severely obstructing pedestrians and traffic. Using the WO-A-2007/141543 arrangement both the foundation element and the charging pole need to be installed at the same time, leaving the owner with the said risks above.

SUMMARY

An object of the present invention is to provide a novel device for mounting of a charging pole, which enables improved infrastructure for electric vehicles to be deployed at low risk and at low cost.

This object, and other objects which will appear from the following description, has/have now been achieved by the present invention by a technique having the features set forth in the appended independent claims; preferred embodiments being defined in the dependent claims.

In one aspect, there is provided a device for mounting of a charging pole comprising a foundation member configured to be installed below ground level, and anchoring means by which the charging pole is mountable to the foundation member and which comprises a detachable adapter element configured to fit the charging pole to the foundation member.

Such a mounting device promotes deployment of infrastructure for charging of electric vehicles by providing a low-cost, future-proof platform for fitting charging poles from any supplier using virtually any charging technology.

In an embodiment, the adapter element is mounted to the foundation member below the top edge of, and preferably inside the foundation member. This is an advantageous feature since the adapter element and the anchoring means between the adapter element and the foundation member are thereby protected by the foundation member, at least from forces coming from the side. The positioning of the adapter element and anchoring means inside the foundation member is advantageous since no upwards projection part may obstruct vehicles or persons passing the top of the device. Another advantageous feature is that since the adapter element is arranged within the foundation element it is not an obstacle when arranging the surrounding environment, e.g. a sidewalk or a parking lot.

In another embodiment, the device further comprises a protection unit which is attached to the adapter element and which is preferably arranged around the charging pole and extending along at least a portion of the charging pole. The protection unit protects the pole from any damage in case a vehicle hits the arrangement. This leads to low reparations costs and undisturbed operation time when the pole can be used for charging batteries of a vehicle.

In a second aspect, there is provided a device for mounting of a charging pole comprising a foundation member configured to be installed below ground level, anchoring means by which the charging pole is mountable to the foundation member, and a cover member for covering upwardly open spaces of the mounting device.

Such a mounting device promotes deployment of infrastructure for charging of electric vehicles by providing a mounting device which allows convenient and inexpensive post-installation of charging poles, since the cover member may easily be removed to allow access to the anchoring means and cable or cable pipe of said mounting device, such that a charging pole may be attached at low cost and in a short time. Further, such a mounting device allows for a longer time period between installation of the system and the time of installation of a charging pole, since the cover member protects inner parts of the mounting device from weather and damage.

In another aspect, a foundation system for charging poles for electrically powered vehicles is provided. The system comprises a plurality of mounting devices according to the invention, as defined in the appended device claims. Each mounting device is prepared for electrical supply by means of one or more cables or cable pipes installed in ground.

The mounting devices and the foundation system make it possible to initially install only a few charging poles at a site, such as a car park, and then easily expand the charging capacity on that site by post-fitting charging poles as demand grows. When post-fitting charging poles, there is no need to dig holes in the street, since additional foundation members are already provided below ground and provided with means for easy provision of power to the charging poles. Also, since no part of the mounting device protrudes above ground level when awaiting mounting of a charging pole, it allows normal utilization of the surface under which the mounting device is buried, without reducing the aesthetics of the site. It should be understood that the meaning of 'below ground level' essentially means that it does not protrude above ground level and thereby it does not obstruct pedestrians or traffic. Hence, the device may be installed below ground with its top surface substantially flush with ground level.

According to yet another aspect of the invention, a method of installing a foundation system of the invention is provided. The method comprises the steps of: providing at least one recess in ground, providing a plurality of mounting devices according to the invention in said at least one recess, providing means for electrical supply to the mounting devices, and restoring ground at said site such that the mounting devices do not protrude above ground level.

Such a method reduces the need for construction work at a site where deployment of infrastructure for charging of electric vehicles is planned, since substantially all excavating and activities are performed once independently of when charging poles are to be deployed at said site. Hence, there is no need of repeatedly opening up the ground level when installing charging poles.

In still another aspect of the invention, a method of installing a charging pole to a foundation system according to the invention is provided. This method comprises the steps of providing access to the anchoring means of the respective mounting device, providing an adapter element for fitting the charging pole to the foundation member, providing electric supply to the charging pole by means of a cable or cable pipe already provided at the mounting device, and securing the charging pole to the mounting device by means of the anchoring means. Such a method allows easy post installation of charging poles to a site where a system of the invention is installed.

According to a preferred embodiment, the foundation member is provided with first coupling means for engagement with a second coupling means of the adapter element. The first and second coupling means make it possible to control the relative position and rotation between the foundation member and the adapter and any thereto attached charging pole.

Further features of the invention and its embodiments are set forth in the appended claims and may also be understood from the following description.

BRIEF DESCRIPTION OF THE DRAWINGS

In the following, embodiments of the invention will be described with reference to non-limiting examples shown in the accompanying drawings, in which.

DETAILED DESCRIPTION

An aspect of the invention relates to a mounting device for optionally mounting a charging pole to ground. A further aspect of the invention relates to a system comprising such mounting devices. Also, an aspect of the invention relates to a method of installing the system of the invention, and another aspect of the invention relates to a method of installing a charging pole by means of a system according to the invention.

Hereinafter, these and other aspects and embodiments of the invention will be described with reference to the appended drawings.

System

Figure 1:
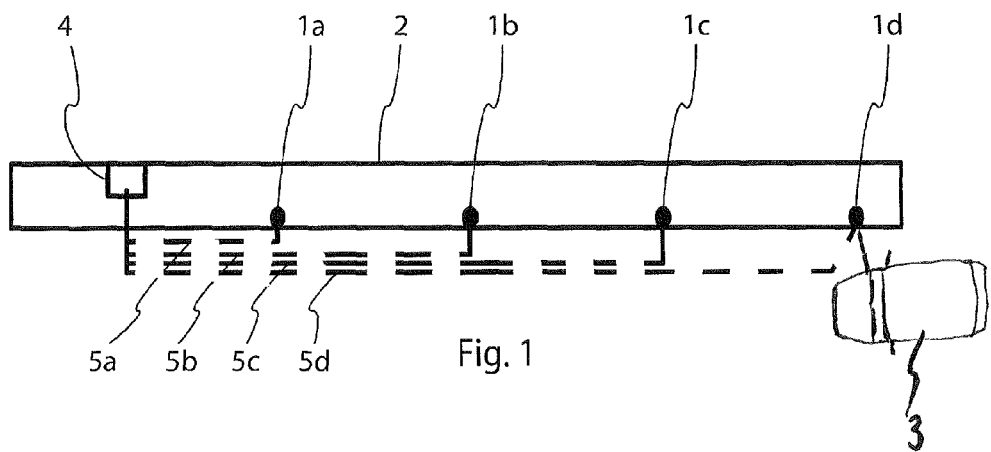
FIG. 1 is a schematic view from above showing a system for charging of electric vehicles.

FIG. 1 shows four charging poles 1a-d for electric vehicles mounted to ground at a pavement 2 using a system according to an embodiment of the invention. An electric vehicle 3 is parked next to one of the poles 1d and is connected to the pole 1 such that batteries (not shown) of the vehicle 3 can be charged. In order to supply electricity to the charging poles 1a-d and the vehicle 3, the poles 1a-d are connected to a grid connection 4 by four connection cables 5a-d installed below ground, preferably protected by conventional cable pipes (not shown) commonly used for underground cable installation.

Figure 2:
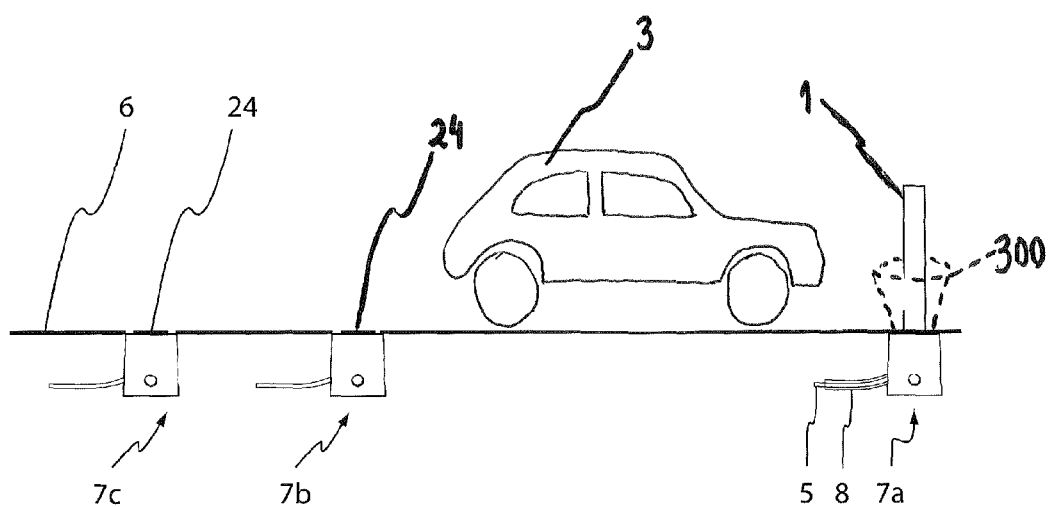
FIG. 2 is a side view of a system installed below ground.
Figure 3:
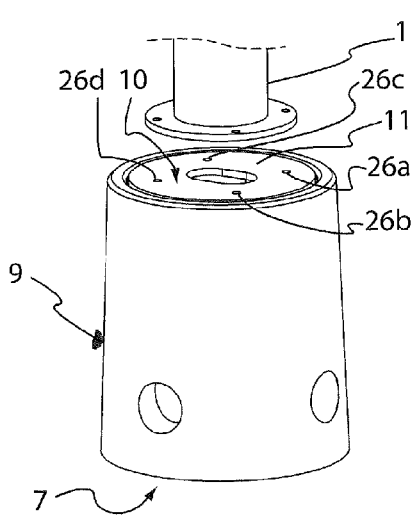
FIG. 3 is a perspective view of a device according to an embodiment of the invention for mounting of a charging pole.
Figure 4:
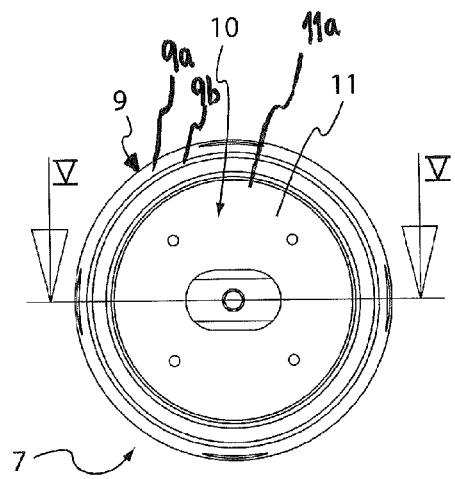
FIG. 4 is a top view of a foundation member of FIG. 3.

FIG. 2 shows a system according to an embodiment of the invention installed in ground 6. A charging pole 1 is mounted to ground using a mounting device 7a according to a first embodiment of the invention. The charging pole 1 is connected to a grid connection (not shown) through a cable 5 provided through the mounting device 7a. As shown, the system comprises a plurality of mounting devices 7a-c installed below ground 6, but only one of them 7a is currently used for mounting a charging pole 1 to ground 6. When needed, additional charging poles may easily be attached to the remaining mounting devices 7b-c without any need of excessive construction work, i.e. without digging up the street/ground 6 again. When installing the system, cables 5 and/or cable pipes 8 are connected to each mounting device 7a-c, such that it is easy to provide electricity to charging poles subsequently mounted to the mounting devices 1a-c of the system. The inner space below ground in each mounting device 7a-c makes it possible to fit an extra length of cable 5 below ground and to post-install a cable through a cable pipe 8 connected to the mounting device 7a-c during installation of the system.

Since no part of the mounting devices 7a-c protrudes above ground level 6 at each respective mounting device 7a-c, the system does not obstruct normal use of the pavement, street or other surface where it is installed. Hence, people can walk and drive normally on the ground level 6 where the system is installed, whilst at the same time the surface is left visually appealing. Further, since an installed system does not give rise to any negative practical or aesthetic side effects, there is for those reasons no hurry to attach charging poles to the site where the system is installed. By this novel system, purchasing and installation of charging poles may preferably be postponed until demand for charging of vehicles rises, thereby reducing cost and financial risk of the deployment of such infrastructure. Thereby it is easy and inexpensive to post-install charging poles to the system, and there should be no reluctance for postponing installation of charging poles for that reason.

Device

FIGS. 3-6 show one of the mounting devices 7 of FIG. 2 next to a charging pole 1 ready to be mounted to ground using the mounting device 7. The mounting device 7 comprises a substantially hollow cylindrical foundation member 9, preferably made of concrete, and anchoring means 10 by which the charging pole 1 is mountable to the foundation member 9. The anchoring means 10 comprises a detachable adapter element 11 configured to fit the charging pole 1 to the foundation member 9.

A first portion 12 of the detachable adapter element 11 fits with the foundation member 9 and a second portion 13 fits with the charging pole 1. The peripheral top edge portion 9a of the foundation member 9 has a circular or annular recess 9b which matches and receives the peripheral portion 11a of the adapter element 11 in a close fit. The depth of the annual recess 9b corresponds to the thickness of the adapter element 11 such that the top surface of the same is substantially flush with the annular top surface of the top edge portion 9a of the foundation member 9.

The first portion 12 is provided with coupling means comprising an aperture or a hole 14 configured to receive a bolt 15 for securing the adapter element 11 to the foundation member 9. An anchoring bar 16 is molded into the foundation member 9 for receiving the bolt 15 in a hole 25, and a threaded element 17 is provided by the anchoring bar 16 for engagement with the bolt 15. The bolt 15 is centrally located in the mounting device 7, such that the adapter element 11 can be rotated and subsequently fixed to hold the charging pole 1 in a desired position. Further, the anchoring bar 16 may have bent ends for stronger engagement with the foundation member 9.

The second portion is provided with coupling means comprising four threaded holes 26a-d configured to receive bolts (not shown) for securing the mounting pole 1 to the adapter element 11 through four corresponding holes of the charging pole.

Figure 5:
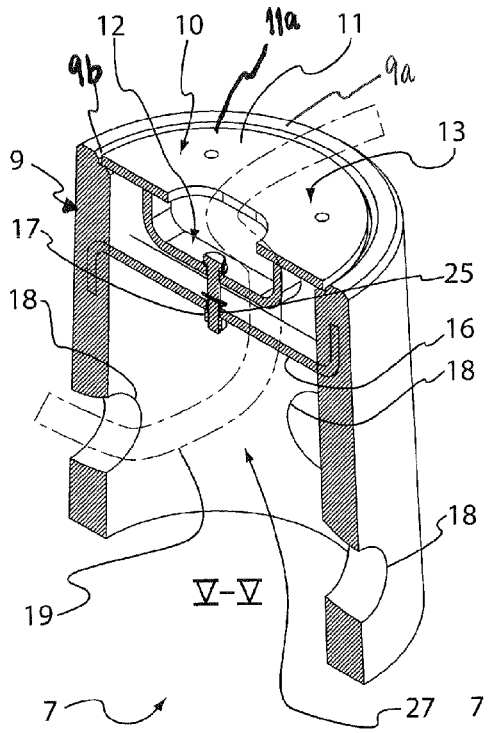
FIG. 5 is a cross-sectional view in perspective of the cross-section along the line V-V shown in FIG. 4.
Figure 6:
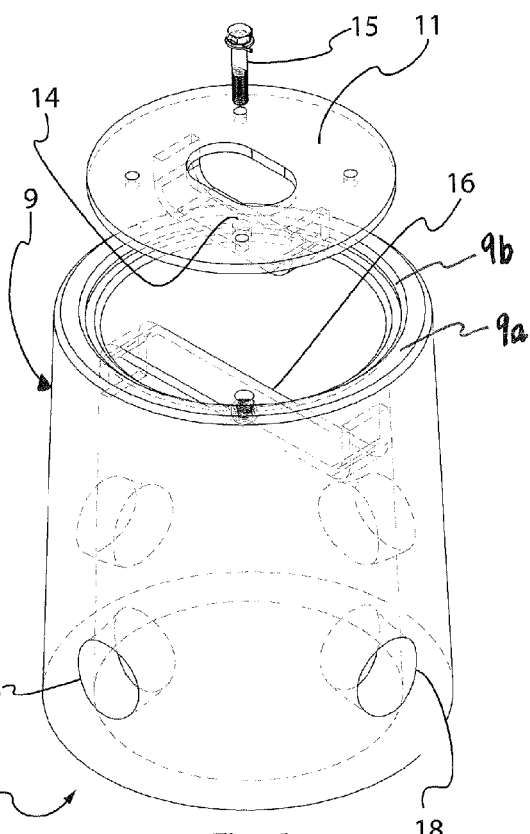
FIG. 6 is an exploded perspective view of the mounting device also shown in FIGS. 3-5.

As shown in FIG. 5, the foundation member 9 has a plurality of entry openings or holes 18 for receiving an electric cable and/or cable pipe from the side of the mounting device. An electric cable 19 (shown in part with dashed lines) may be introduced into the mounting device through one of the entry holes 18 and connected to the charging pole through the inner space of the foundation member 9. An advantage of these entry holes 18 is that during installation of mounting devices 7 one does not have to dig as deep in order to be able to fit the cable or cable pipe into the mounting device 7. Of course, the entry holes 18 could be provided through the bottom of the foundation member 9 but then one would have to dig deeper to fit the cable 19 or cable pipe. Further, since there are a plurality of entry holes 18, more cables may be introduced into the mounting device 7 and from several directions. Thus, a main cable may be coupled to the mounting devices, one after the other, wherein power may be taken from the main cable at each respective mounting device for providing power to charging poles through an additional length of cable. If cables are installed like this, the total length of cable needed for connecting the system to a grid connection may be somewhat reduced as opposed to using a separate cable for each respective mounting pole stretching all the way from the grid connection to the respective pole. Alternatively, the entry holes 18 are used for connecting mounting devices 7 via cable pipes for subsequent installation of one or more cables through the cable pipes.

The design of the charging pole and its foot or base varies depending on the choice of charging pole provider and pole model. Therefore, the upper portion of the adapter element 11 should be designed accordingly to provide suitable coupling means for coupling the charging pole 1 to the adapter element 11.

The coupling means between the foundation member 9 and the adapter element 11 are designed such that, when the charging pole is forcefully rotated and moved, for example when hit by a car, the adapter element and/or the coupling means deforms and/or breaks without damaging or disrupting the functionality of the foundation member 9.

Figures 7, 9:
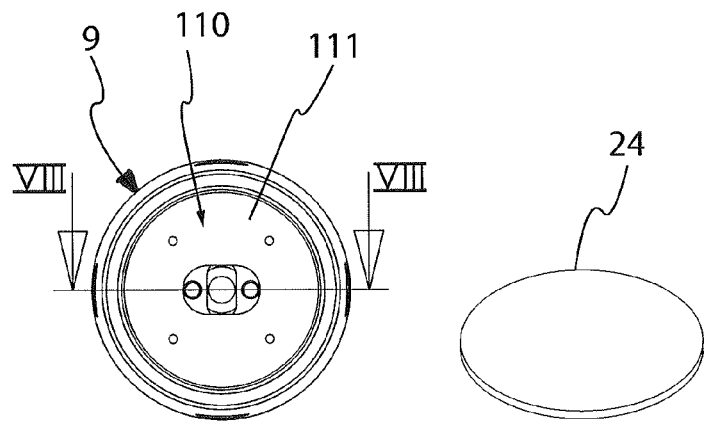
FIG. 7 is a top view of a mounting device according to an embodiment of the invention.
FIG. 9 is a perspective view showing a cover member according to an embodiment of the invention.
Figure 8:
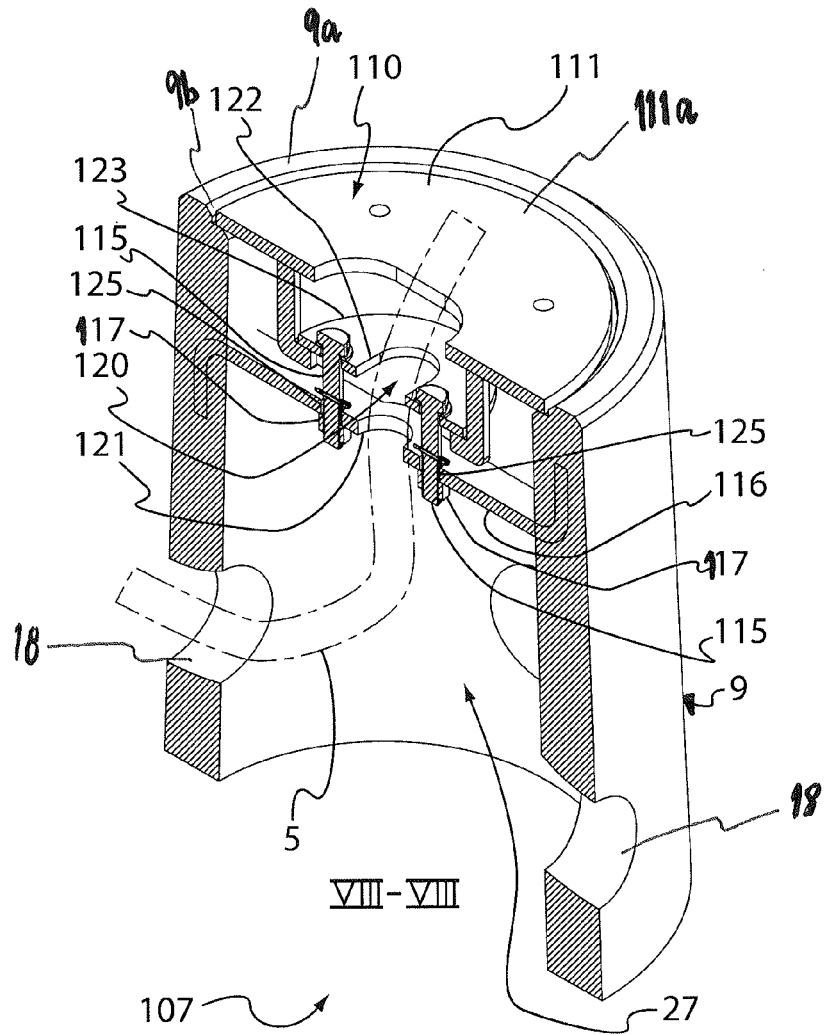
FIG. 8 is a cross-sectional view in perspective of the cross-section along the line VIII-VIII in FIG. 7.

FIGS. 7 and 8 show a mounting device 107 according to a second embodiment of the invention. This embodiment is similar to the previously described embodiment and therefore like reference numerals are increased by one hundred for easier recognition, for example 107 instead of 7, etc. A difference with respect to the previously described embodiment is the design of the anchoring means for attaching the charging pole to the foundation member 9. Here, a central passage 120 is provided through the anchoring means 110, such that rotation of the charging pole/adapter element 1/111 will not cause the cable 5 to be cut or damaged between the anchoring bar 116 and the adapter element 111. The anchoring bar 116 is provided with a central hole 121 through which the cable 5 to the charging pole passes, and a matching central hole 122 is provided through a mounting plate 123 of the adapter element 111. The mounting plate 123 is freely rotatable relatively the rest of the adapter element 111, and may thus be secured to the anchoring bar 116 without preventing adjustability during mounting of a charging pole. Two bolts 115 are provided to hold the attachment plate to the anchoring bar 116 and keep them from relative rotation.

Figure 10:
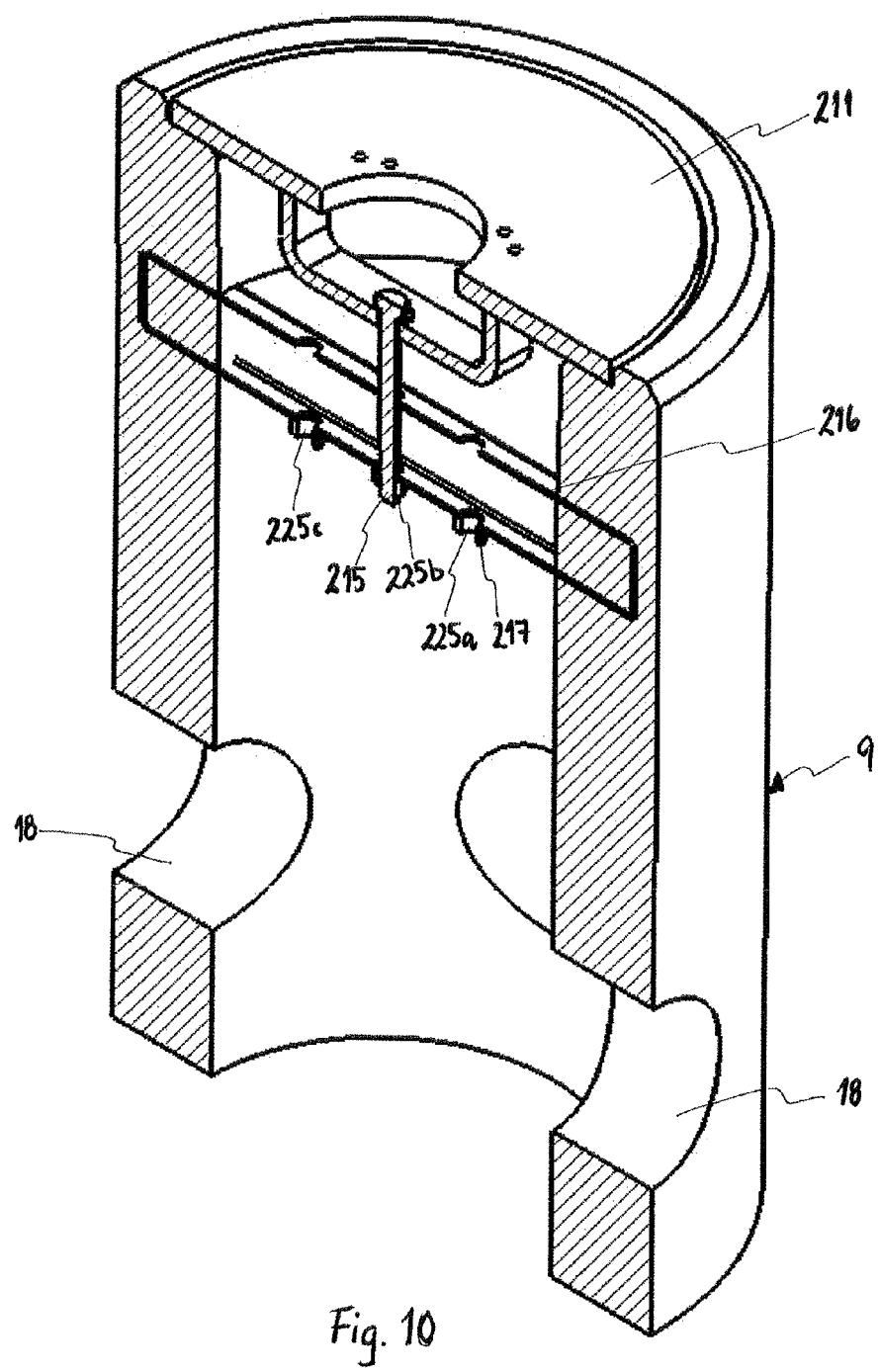
FIG. 10 shows a cross-sectional view in perspective according to another embodiment.

In yet another embodiment another type of anchoring bar 216 is provided, as shown in FIG. 10. The anchoring bar 216 has the shape of a straight bar which may be provided with a hollow core, which leads to lower manufacturing cost and less material consumption. Between the two ends of the bar 216, there are three holes 225a-c each of which may receive a bolt 215 when engaging an adapter element 11; 111; 211 to the foundation member 9. In FIG. 10 an adapter element 211 similar to the adapter element 11 shown in FIG. 5 is used. This adapter element 11 is provided with a first element 12 which, in this case, includes one hole 14 somewhere in the middle of the first element 12, which corresponds to the hole 225b of the bar 216, for receiving a bolt 215 when mounting the adapter element 211 to the foundation member 9. Since the bar 216 shown in FIG. 10 is provided with more than one hole it is also adapted for receiving the type of mounting plate 123 shown in FIG. 8 which includes, in this case, two possible attachment holes 125, disposed one on each side of the central hole 122, which corresponds to the two holes 225a, 225c of the bar 216. At one end of the threaded holes 225a-c a threaded element 217, which is a protrusion extending in a direction away from the anchoring bar 216, is arranged for anchoring the bolt 215 to the anchoring bar 216.

In other embodiments, the adapter element could be secured to the foundation member by other means than a bolt, such as by welding, adhering, or snap locking (not shown). Releasable engagement is preferred since it allows the adapter element to be temporarily removed to allow it to be modified for fitting a certain type of charging pole or for mending it if it has been damaged. Alternatively, it may be replaced by another adapter element of the same type or of a different type (not shown).

In the above described embodiments, the foundation member 9 is provided with first coupling means, namely the anchoring bar 16; 116; 216 for engagement with a second coupling means of the adapter element 11; 111; 211, namely the mounting plate 123 and/or the bolt(s) 15; 115; 215. It should be understood that the skilled person, within the scope of the invention, may provide other coupling means for joining the adapter element 11; 111; 211 to the foundation member 9.

The modularity due to the provision of an adapter element 11; 111; 211 is of advantage since it allows any type of charging pole to be attached to the foundation member 9 without a substantial redesign or exchange of the mounting device. Thereby, the risk of an installed mounting device becoming obsolete is greatly reduced, effectively reducing the risk of investing in deployment of infrastructure for charging of electric vehicles.

The adapter element 11; 111; 211 is detachable such that it may be removed and optionally exchanged. Hence, an advantage of the system is that it enables easy post installation of charging poles 1 at a low cost.

As shown in FIG. 9, a cover member 24 may be provided for covering an upper portion of the foundation member 9 when no adapter element is present, such as by initial installation of a system when the number of installed mounting devices 7, 107 exceeds the number of installed charging poles 1. The cover member 24 is adapted to the foundation member 9 such that it covers inner space of the foundation member 9 to which the adapter element is supposed to fit. Thus, people can walk and drive normally on the ground level 6 where the system is installed. Also, sensitive parts inside the mounting device are protected from dirt and rain, for example electric cables that might be present. Extra protection may be provided by providing sealing means between the foundation member 9 and the cover member 24. In the basic embodiment shown in FIG. 9, the cover member is a circular plate but in other embodiments it may be provided with attachment means for attachment to the foundation member 9, such as snap locking means or means for rotational interlocking with the foundation member 9.

Protection of the System

Figure 11:
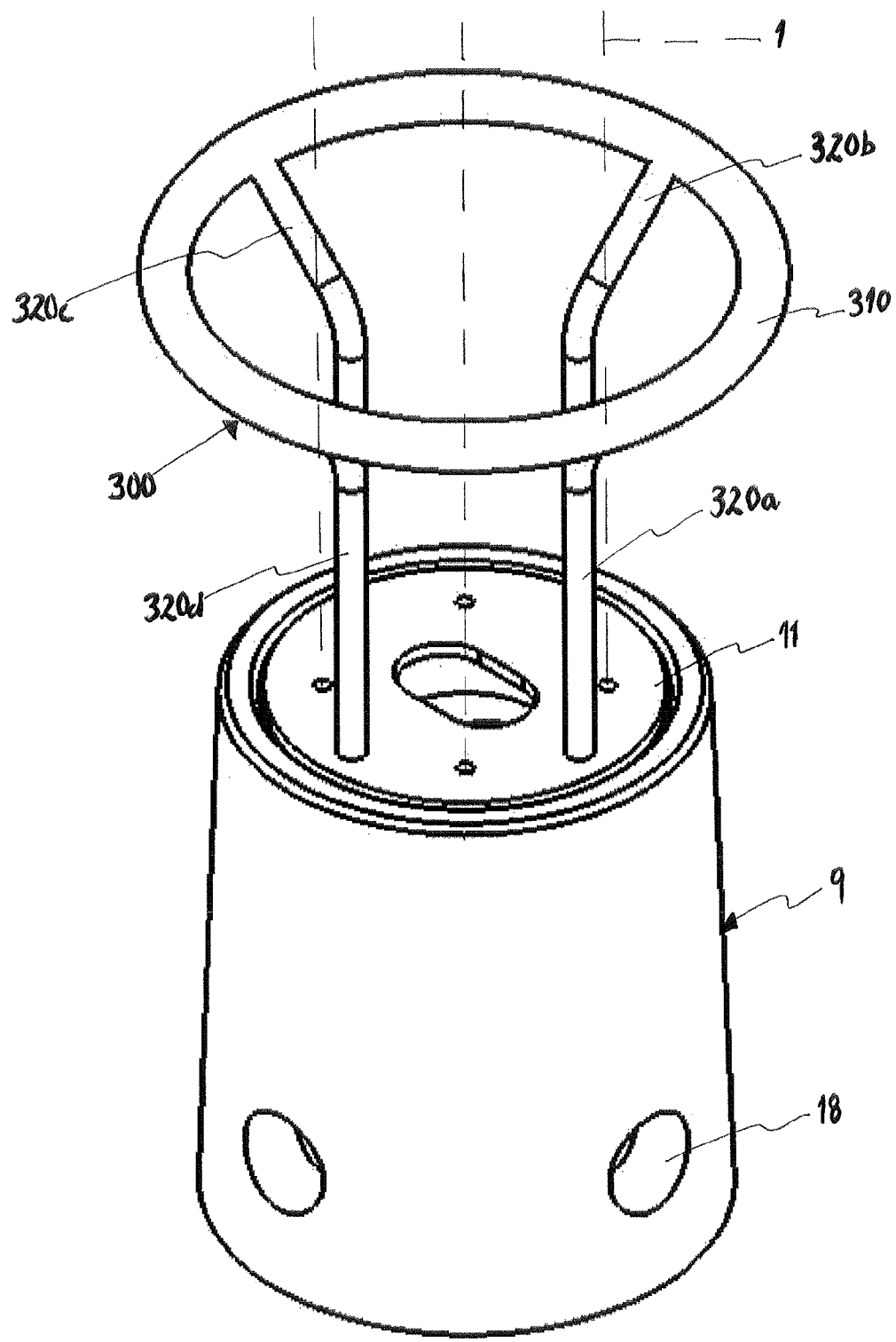
FIG. 11 shows a perspective view of the device shown in FIG. 3 provided with a protection unit.
Figure 12:
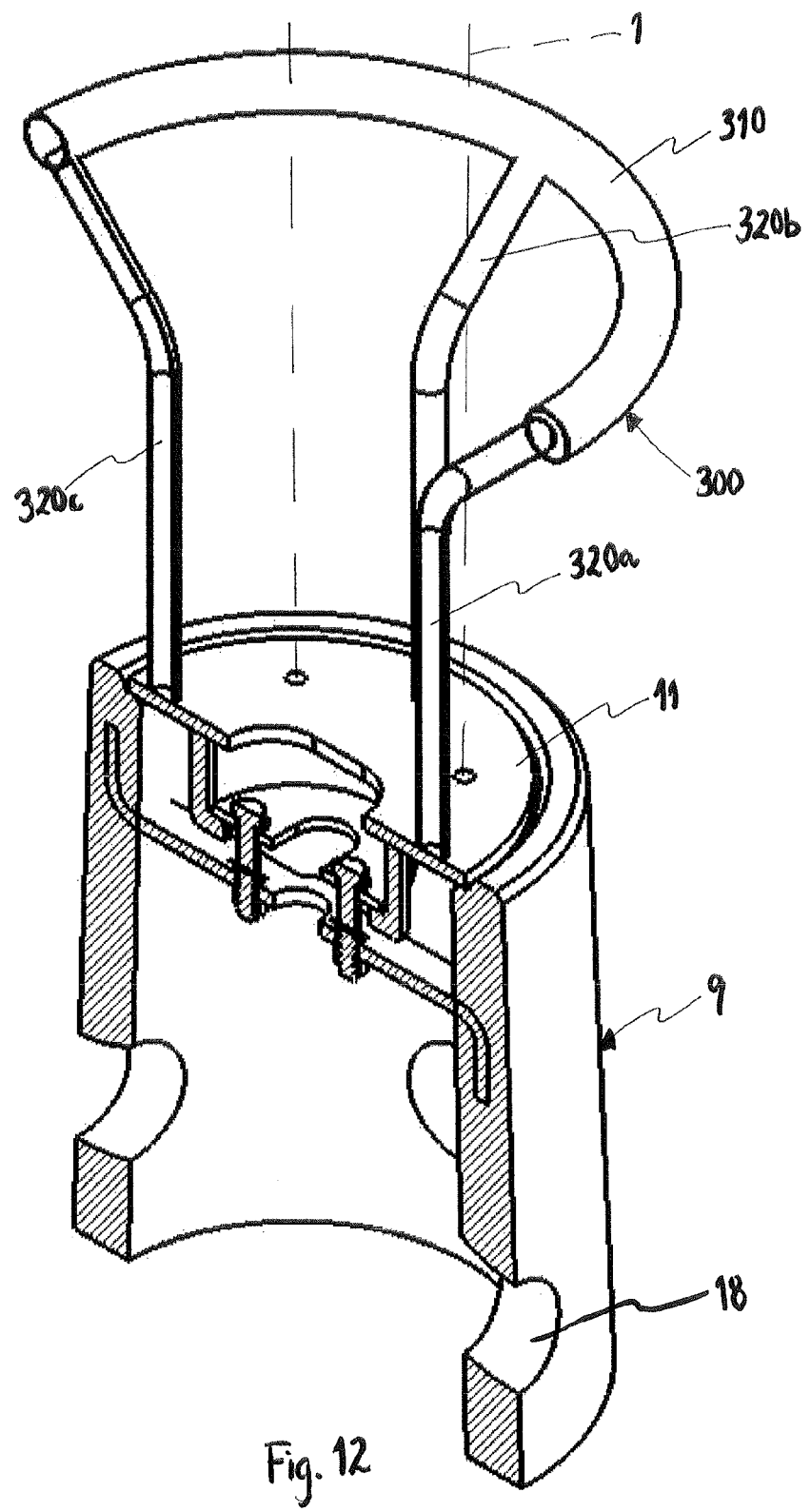
FIG. 12 shows a cross-sectional view of the device shown in FIG. 11.

In an embodiment shown in FIGS. 11 and 12 a protection unit 300 is provided around the charging pole 1, shown in FIG. 2, for protection of the pole 1 from being hit by vehicles 3. The protection unit 300 may comprise an upper ring 310 for surrounding the pole 1, and four legs 320a-d extending along at least a portion of the extension of the pole 1, attaching the ring 310 to the adapter element 11 by means of additional holes, welds or other fastening means (not shown). The ring 310 and the four legs 320a-d may be made of any suitable material such as plastic, rubber or metal and may also be made as a solid or a hollow part.

An advantage of the adapter element 11 is thus that a protection unit 300, or the like, for protection of the charging pole 1 may be attached to the adapter element 11. Thus, if the protection unit 300 or charging pole 1 is hit by a vehicle 3, damage to the mounting device 7 is limited to the protection unit 300 and/or adapter element 11. Typically, only the adapter element 11 will need to be replaced after such an accident and not the whole mounting device 7.

Thus, the mounting device 7 provides lower overall maintenance cost of the infrastructure system, and also higher availability in terms of number of fully functioning charging poles 1, since replacement of the adapter element 11 can be made quickly without digging up, mending or replacing the foundation member 9.

Installation of System

The system according to the invention may be installed at a site by performing the following method steps:
providing a recess in ground,
providing a plurality of mounting devices 7; 107 according to the invention in said recess,
providing means for electrical connection to the mounting devices, for example by connecting cable pipes 8, and optionally cables 5, to the entry holes 18 of the mounting devices 7; 107, and
restoring ground 6 at said site such that no part of the mounting devices 7, 107 protrudes above ground level, for example by filling the recess with dirt and gravel.

Then either a cover member 24 or an adapter element 11; 111; 211 is provided at each respective mounting device 7; 107, depending on if a charging pole 1 is to be initially installed at the mounting device 7; 107 or not. By providing the recess, the mounting devices 7; 107 are positioned deep enough not to protrude above desired ground level.

Finally, a protection unit 300 may be mounted if there has been an adapter element 11; 111; 211 and a charging pole 1 have been installed.

Post Installation of Charging Pole

As previously mentioned, a system according to the invention permits convenient and inexpensive post installation of charging poles 1. A charging pole 1 may be mounted to a mounting device 7 by performing the following method steps:
providing access to the anchoring means 10 of the mounting device 7 providing an adapter element 11 for fitting the charging pole 1 to the foundation member,
providing for electric supply to the charging pole by means of a cable 5 or cable pipe 8 of the foundation system, and
securing the charging pole 1 to the mounting device 7 by means of the anchoring means 10.

Access to the anchoring means 10 may be provided by removing the cover member 24, if present, and/or uncovering the mounting device 7, if covered by paving or the like.

It is to be appreciated that the inventive concept is by no means limited to the embodiments described herein, and many modifications are feasible within the scope of the invention set forth in the appended claims. For instance, other materials can be used for the elements included in the device and the system. Furthermore, other connection means can be used as long as reliable joining of the elements is achieved.

The invention claimed is:

1. A method of installing a foundation system for charging poles for electrically powered or hybrid vehicles, the method comprising:
   providing a plurality of mounting devices, each mounting device comprising:
      a hollow foundation member configured to be installed below ground level, the foundation member including an upper surface, a lower surface, a height between the upper surface and lower surface, a width perpendicular to the height, and a first coupling element located entirely below the upper surface and extending diametrically across the width; and
      a detachable adapter element configured to attach one of the charging poles to the foundation member, the detachable adapter element including a second coupling element configured to be attached to the first coupling element below the upper surface of the foundation member;

wherein each mounting device is prepared for electrical supply by at least one cable or cable pipe installed in the ground;

providing at least one recess in the ground;

placing the plurality of mounting devices in the at least one recess;

providing the at least one cable or cable pipe to the mounting devices; and restoring the ground in the at least one recess such that no part of the mounting devices protrudes above ground level.

2. A method according to claim 1, further comprising:

providing the adapter elements of the plurality of mounting devices with protection units.

3. A method of installing a charging pole to a foundation system, the method comprising:

providing at least one mounting device, the at least one mounting device comprising:

a hollow foundation member configured to be installed below ground level, the foundation member including an upper surface, a lower surface, a height between the upper surface and lower surface, a width perpendicular to the height, and a first coupling element located entirely below the upper surface and extending diametrically across the width; and a detachable adapter element configured to attach the charging pole to the foundation member, the detachable adapter element including a second coupling element configured to be attached to the first coupling element below the upper surface of the foundation element;

wherein the at least one mounting device is prepared for electrical supply by at least one cable or cable pipe installed in the ground;

attaching the adapter element of the at least one mounting device to the foundation member of the at least one mounting device;

attaching the charging pole to the adapter element of the at least one mounting device; and providing electric supply to the charging pole by the at least one cable or cable pipe already provided at the at least one mounting device.

4. A method according to claim 3, further comprising:

providing the adapter element of the at least one mounting device with a protection unit.

\* \* \* \* \*